3,251,791
SYNTHETIC RESINOUS COMPOSITIONS FOR
SURFACE COATINGS
Sydney Laurence Goodchild, 14 Downs Hill,
Beckenham, Kent, England
No Drawing. Filed July 17, 1962, Ser. No. 211,157
Claims priority, application Great Britain, July 28, 1961,
27,551/61
4 Claims. (Cl. 260—19)

This invention relates to synthetic resinous compositions for surface coatings and is concerned with resinous compositions which can be dispersed in an aqueous solvent containing water as the sole or principal constituent, in the presence of ammonia or a suitable organic base, for example dimethylaminoethanol, to form a solution which may be used as a stoving varnish or as a liquid vehicle for a stoving paint, with which solution it is possible to form durable surface coatings having an improved resistance to caustic alkalis.

One known method of preparing a resinous composition suitable for forming on dilution with water a stoving varnish consists in the cold or warm blending of a hydrophilic phenolic or amino resin with an alkyd resin of acid value about 60 and having numerous free hydroxyl groups, followed by the substantial neutralisation of the resulting mixture with ammonia or an organic base. It has also been proposed to improve the stability in water solution of the phenolic resin component by introducing a carboxyl group into the phenol employed, for example by using the monoglycollic acid ether of diphenylolpropane. However, such resins have poor alkali resistance and also suffer from other film dects such as cratering.

The compatibility of alkyd resins with many phenolic resins (resoles) or amino resins (aminoplasts) is poor or borderline and it has been proposed to improve their compatibility by treating the alkyd resin with peroxides such as hydrogen peroxide. This can be done, but it has been found that the alkali resistance of the final product is also poor.

One of the earliest forms of paint resin soluble in water after neutralising with ammonia, was prepared from drying or semi-drying vegetable oils or fatty acids derived therefrom by reacting them with one mole of maleic anhydride per equivalent of one mole of fatty acid. Here again the stoved film is readily attacked by alkali and not sufficiently hard for many industrial paints. Such a maleinised oil or fatty acid can be hardened by the admixture with it of a water soluble phenol-formaldehyde resole but again the alkali resistance is poor. It is well known that phenolformaldehyde resoles formed from alkyl-substituted phenols give improved properties in varnishes dissolved and thinned with organic solvents but such resoles do not give stable water solutions when mixed with the above type of maleinised oil. Such mixtures, tested before the aqueous solution separates into different phases, give stoved films which also have poor alkali resistance.

It has now been discovered, in accordance with the present invention, that a resinous composition, suitable for use as a stoving varnish when dispersed in an aqueous solvent in the presence of ammonia or a suitable organic base, can be prepared by heating a substantially anhydrous mixture of a resole, i.e. a phenolic resin formed by condensing together formaldehyde and phenol or preferably a higher homologue thereof such as m-cresol or 2:4-xylenol, with an adduct formed from one or more unsaturated long chain fatty acids and an organic polybasic unsaturated acid containing an $\alpha$-$\beta$ enal grouping, or an anhydride or precursor of said acid, a polyol such as, for example, trimethylolpropane, or pentaerythritol, preferably being present in the mixture.

To form a stoving varnish, the resinous composition prepared in the foregoing manner is dispersed in an aqueous solvent in the presence of ammonia or an organic base. Thus the resinous composition may be dissolved, for example, in water containing an organic base such as dimethylaminoethanol, or in a mixture of aqueous ammonia and an alcohol such as isopropyl alcohol, the solution obtained in either case being freely dilutable with water to form the desired stoving varnish.

In the preparation of the resinous composition the mixture of the resole and adduct can be heated to a temperature in the range of from 110 to 200° C., a temperature in the range of from 130 to 180° C. preferably being employed.

The long chain fatty acids employed in the preparation of the adduct used in the process of the present invention preferably contain at least 10 carbon atoms in the carbon chain. Instead of using a single acid, there is preferably employed a mixture of fatty acids such as, for example, tall oil fatty acids or linseed oil fatty acids, or alternatively a mixture of fatty acids with other acids. An example of such a mixture is tall oil.

The organic polybasic unsaturated acids used in preparing the adduct should contain an $\alpha$-$\beta$ enal grouping, i.e. an $\alpha$-carbon atom with respect to one of the carboxyl groups of the acid should be connected to a $\beta$-carbon atom by an ethylenic double bond. Examples of suitable acids are maleic acid and itaconic acid. Instead of the acid itself being used, the anhydride thereof, for example maleic anhydride, may be used. Alternatively a precursor of the acid which, under the reaction conditions, will yield the desired acid may be used. An example of such a precursor is citric acid which on heating decomposes to give inter alia itaconic acid.

It has been found that in the preparation of the aforementioned adduct, the ratio of polybasic acid or anhydride to long chain fatty acid may be as low as 0.5 mol of the former per mol of the latter without detriment to the water dilutability of the desired water-soluble product. Furthermore, it has been found preferable to use high ratios of formaldehyde to phenol in preparing the resoles which are reacted with the adduct, i.e. over 1.4 mols of formaldehyde per mol of phenolic hydroxyl group.

The adduct employed in the process of the invention is of much simpler molecular structure than an alkyd resin and has good solvent power for the aforementioned resoles even in the cold, and can be reacted with these resoles to achieve at least some degree of chemical combination and also to tie the polyol (if present) to the adduct by one or more of its hydroxyl groups. The polyol may react further when the varnish or paint film is stoved and will thereby neutralise the acidity of the adduct.

An advantage of employing the unsaturated fatty acid adduct is that it is possible to select the polyol which may be introduced into the reaction mixture so that glycerol is not present, as it would be if vegetable oils, which are glycerides, were used. It is known that glycerol gives rise to polymers of inferior alkali resistance.

The adduct on heating with the resole will form the desired resinous composition even in the presence of a small amount of water. It is therefore possible to react the adduct with an aqueous resole syrup by mixing the adduct and resole syrup, gradually boiling off substantially all the water present, and thereafter reacting the adduct and resole smoothly and without the difficulty arising of the resole self-reacting in a separate phase to an insoluble state. Alternatively, the aqueous resole syrup may be dehydrated under moderate temperature conditions before it is mixed with the adduct. For example the resole may be dehydrated by mild heat in vacuo or by boiling off the water at normal atmospheric pressure in the presence of a polyol (which will normally be the same as that preferably present when heating the adduct and the resole) which prevents excessive chemical condensation of the resole and consequent loss of solubility and reactivity towards the adduct.

The fact that the adduct is polyol-free enables the full theoretical amount of polyol (when used) to be mixed with the resole and the adduct, and the resulting mixture of the three low molecular weight materials may be heated to a temperature as high as 200° C., the temperature limit being controlled by the reactivity of the resole employed. At such high temperatures, as compared with the known art, only short reaction times are possible owing to the considerable reactivity of the low molecular weight constituents. Nevertheless, the heating enables a satisfactory body to be achieved before gelation sets in and the constituents can, for example, be cooked to a soft pill before cooling and thinning the resulting resinous composition with water and ammonia or a suitable base such as, for example, dimethylaminoethanol.

By means of the process of the invention, it is possible to obtain a stable water dilutable system from resoles based on cresols or even higher phenols which by cold blending is not possible. Furthermore, it has been surprisingly found that resinous compositions obtainable by the process of the invention will tolerate additions of water-soluble phenol-formaldehyde resoles with perfect compatibility and that the resulting blends are stable on dilution with water, in certain cases, for many months. Moreover the desired properties obtained by using resoles based on higher phenols in the reaction with the adduct are not impaired by this subsequent addition of phenol resole and in fact stoving temperatures of films cast from such a blend may be reduced from 170° C. to 150° C. whilst maintaining the resistance of the resulting coating to detergents and caustic alkalis.

Although the resinous compositions are particularly useful in the manufacture of stoving varnishes and paints, they also find utility in other fields. Thus they may, for example, be used in the manufacture of electrical impregnating varnishes with which electrical components may be impregnated in order to improve the insulation thereof.

For a better understanding of the invention and to show how the same may be carried into effect, the following illustrative examples will now be given.

*Example 1*

(A) An adduct was formed by reacting together 280 g. of tall oil fatty acids (iodine value about 150) with 50 g. of maleic anhydride at 210° C. for 4 hours.
(B) A resole was prepared by condensing 108 g. of mixed cresols containing 42% of m-cresol with 198 g. of aqueous formaldehyde (37%) in the presence of 6 g. of dimethylaminoethanol for 6 hours at 60° C.

330 g. of the adduct A, 310 g. of the cresol resole B and 134 g. of trimethylolpropane were heated together. The temperature was raised over a period of 1–1¼ hours to 180° C. thereby boiling off the water present in the resole and forming the desired resinous composition.

On cooling, the resinous composition was dissolved in 117 g. of dimethylaminoethanol and 167 g. of water. The resulting solution was clear and bright and freely dilutable with water. Films cast from the further diluted solution and stoved for 30 minutes at 170° C. gave surface coatings which were clear and tough and which exhibited resistance to 2% caustic soda solution for several times as long as known commercial types of water-soluble plasticised phenolic resoles.

*Example 2*

The process of Example 1 was repeated replacing the resole B by a resole prepared by condensing together 108 g. of mixed cresoles containing 42% m-cresol with 198 g. of aqueous formaldehyde (37%) in the presence of 14 g. of dimethylaminoethanol for 6 days at room temperatures. The resulting resinous composition had properties similar to that prepared in Example 1.

*Example 3*

The process of Example 1 was repeated to form the desired resinous composition which, on cooling, was dissolved in 110 g. of isopropyl alcohol and 180 ml. of 10 N aqueous ammonia solution to give a solution freely dilutable with water.

*Example 4*

The reactants used in Example 1 were condensed at 130° C. for 2½ hours thereby forming the required resinous composition, which when dissolved in dimethylaminoethanol and water as in Example 1 or in isopropyl alcohol and aqueous ammonia as in Example 3 gave a freely water-soluble product which had the required properties when stoved as a film at 170° C.

*Example 5*

The reactants used in Example 1 were heated together at 110° C. for 7 hours, there being obtained a resinous composition which when dispersed in dimethylaminoethanol and water had adequate water dilutability.

*Example 6*

The process of Example 1 was repeated replacing the trimethylolpropane by 105 g. of pentaerythritol, the mixture being heated together to a final temperature of 160° C over 1 hour, thereby forming the desired resinous composition which when dissolved in dimethylaminoethanol and water as described in Example 1 gave a water-soluble product with the required film properties on stoving.

*Example 7*

The process of Example 1 was carried out replacing the adduct A by 330 of an adduct prepared by heating together 280 g. of linseed oil fatty acids and 50 g. of maleic anhydride for 5 hours at 210° C. and finally condensing the reactants at 190° C. The resinous composition so formed was then cooled and dissolved in 110 g. of isopropyl alcohol and 200 ml. of 10 N aqueous ammonia. The resulting solution had a viscosity of 15 poise at 25° C., was clear and bright and could be freely diluted with water.

*Example 8*

The process of Example 1 was carried out replacing the adduct A by 345 g. of an adduct formed by heating together 280 g. of tall oil fatty acids and 65 g. of itaconic acid at 240° C. for 7 hours.

The reactants were finally heated to 200° C., cooled and dissolved in 40 g. of isopropyl alcohol and 200 ml. of 10 N ammonia. The resulting solution was clear and bright and freely dilutable with water.

*Example 9*

The process of Example 1 was carried out to form the required resinous composition. On cooling, this resinous composition was dissolved in 180 ml. of 10 N ammonia and to the resulting solution were added 200 g. of a water-soluble phenol-formaldehyde resole formed by condensing 64 g. of phenol ($C_6H_5OH$) with 161 g. of aqueous formaldehyde (37%) in the presence of 1.5 g. of dimethylaminoethanol for 8 hours at 60° C. The resulting product had a viscosity of 40–50 poise at 25° C., was freely dilutable with water and films cast from this solution and stoved at 150° C. for 30 minutes were clear and tough and had good resistance to 2% caustic soda solution.

*Example 10*

The process of Example 1 was carried out replacing the cresol resole B by 285 g. of a xylenol-formaldehyde resole formed by condensing 102 g. of 2:4-xylenol with 163 g. of aqueous formaldehyde (37%) in the presence of 2 g. of dimethylaminoethanol and 18 g. of ethyl alcohol for 140 hours at 40° C. The resinous composition thus formed was dissolved in 75 g. of isopropyl alcohol and 200 ml. of 10 N ammonia giving a clear bright solution which was freely dilutable with water.

*Example 11*

The process of Example 1 was carried out replacing the adduct A by 330 g. of an adduct prepared by heating 280 g. of tall oil containing 30% rosin acids with 50 g. of maleic anhydride at 210° C. for 4 hours. The resulting resinous composition on cooling was dissolved in 117 g. of dimethylaminoethanol and 167 g. of water. This aqueous solution was clear and bright and was freely dilutable with water.

*Example 12*

310 g. of the cresol resole B described in Example 1 were heated with 134 g. of trimethylolpropane and the water present boiled off. When the temperature reached 110° C., 330 g. of the adduct A as described in Example 1 were added and the temperature raised to 180° C., thereby producing the desired resinous composition which, after dissolving in dimethylaminoethanol and water, was freely dilutable with water and gave films which when stoved at 170° C. had good alkali resistance.

I claim:

1. Process for preparing a resinous product which forms a stable solution suitable for use as a stoving varnish when dissolved in an aqueous solvent in the presence of a basic compound selected from the group consisting of ammonia and organic bases, which process comprises heating at a temperature in the range from 110–200° C. a substantially anhydrous mixture of (1) a resole, (2) an adduct formed from at least one unsaturated long chain fatty acid and an unsaturated compound selected from the group consisting of organic polycarboxylic unsaturated acids containing an $\alpha$-$\beta$ enal grouping, anhydrides of said acids and precursors of said acids which under the reaction conditions will yield said acids, and (3) a polyol to form a resinous product.

2. Process for preparing a resinous product which forms a stable solution suitable for use as a stoving varnish when dissolved in an aqueous solvent in the presence of a basic compound selected from the group consisting of ammonia and organic bases, which process comprises heating at a temperature in the range from 130–180° C. a substantially anhydrous mixture of (1) a resole, (2) an adduct formed from an unsaturated long chain fatty acid selected from the group consisting of tall oil fatty acids, linseed oil fatty acids and tall oil, and an unsaturated compound or precursor therefor selected from the group consisting of maleic acid, itaconic acid, maleic anhydride and citric acid, and (3) a polyol to form a resinous product.

3. Process according to claim 2, wherein the polyol is one selected from the group consisting of trimethylolpropane and pentaerythritol.

4. Process according to claim 2, wherein the resole is formed by condensing together formaldehyde and a higher homologue of phenol selected from the group consisting of meta-cresol and 2:4-xylenol.

References Cited by the Examiner

UNITED STATES PATENTS

| | | | |
|---|---|---|---|
| 2,185,080 | 12/1939 | Haroldson | 260—19 |
| 2,188,884 | 1/1940 | Clocker | 91—68 |
| 2,188,885 | 1/1940 | Clocker | 260—410 |
| 2,275,843 | 3/1942 | Clocker | 260—404.5 |
| 2,586,385 | 2/1952 | Runk | 260—19 |
| 2,839,434 | 6/1958 | Haughney et al. | 260—19 |

FOREIGN PATENTS 1,071,945   12/1959   Germany.

OTHER REFERENCES

Runk II, "Properties of Heat Reacted Oil-Soluble Phenolic Resins," Industrial & Engineering Chemistry, Vol. 42, No. 10, October 1950 (pages 2110–2114 relied on).

"Resin & Mineral Oil Varnish," American Ink Maker, Vol. 25, No. 10, October 1947 (pages 34, 35, and 53 relied on).

LEON J. BERCOVITZ, *Primary Examiner.*

R. W. GRIFFIN, F. McKELVEY, *Assistant Examiners.*